United States Patent [19]

Zivkovic

[11] Patent Number: 5,165,803
[45] Date of Patent: Nov. 24, 1992

[54] ELASTIC LINK BEARING FOR WHEEL SUSPENSIONS OF MOTOR VEHICLES

[75] Inventor: Milorad Zivkovic, Filderstadt, Fed. Rep. of Germany

[73] Assignee: Mercedes-BEnz AG, Fed. Rep. of Germany

[21] Appl. No.: 727,467

[22] Filed: Jul. 9, 1991

[30] Foreign Application Priority Data

Jul. 10, 1990 [DE] Fed. Rep. of Germany ....... 4021928

[51] Int. Cl.⁵ .............................................. F16C 17/10
[52] U.S. Cl. ..................................... 384/140; 384/222
[58] Field of Search ............... 384/140, 222, 281, 280, 384/270, 300

[56] References Cited

U.S. PATENT DOCUMENTS 3,304,136 2/1967 Müller .

FOREIGN PATENT DOCUMENTS 287407 1/1971 Austria .
812748 9/1951 Fed. Rep. of Germany .
1877299 8/1963 Fed. Rep. of Germany .
2623870 12/1977 Fed. Rep. of Germany .
2202923 10/1988 United Kingdom .

OTHER PUBLICATIONS

Machine Digest/Aug. 10, 1989, p. 44–"Third Link, Bushing Improve Front Suspension" (1989).

Primary Examiner—Lenard A. Footland
Attorney, Agent, or Firm—Evenson, Wands, Edwards, Lenahan & McKeown

[57] ABSTRACT

An elastic link bearing for wheel suspensions is provided in which under the effect of axial forces, two elastomeric bushes which receive the link lug and belong to two identical bearing elements insertable into the link lug from its end faces, are subjected to uniform stress. Knocking noises during the relief of the bearing are prevented. Each of the elastomeric bushes is vulcanized onto respective rotatably mounted intermediate sleeves carrying a vulcanized-on connecting bush having a stop flange and being pressable into one of the end faces of the link lug. The intermediate sleeves are supported on one another under axial load within the link lug.

3 Claims, 1 Drawing Sheet

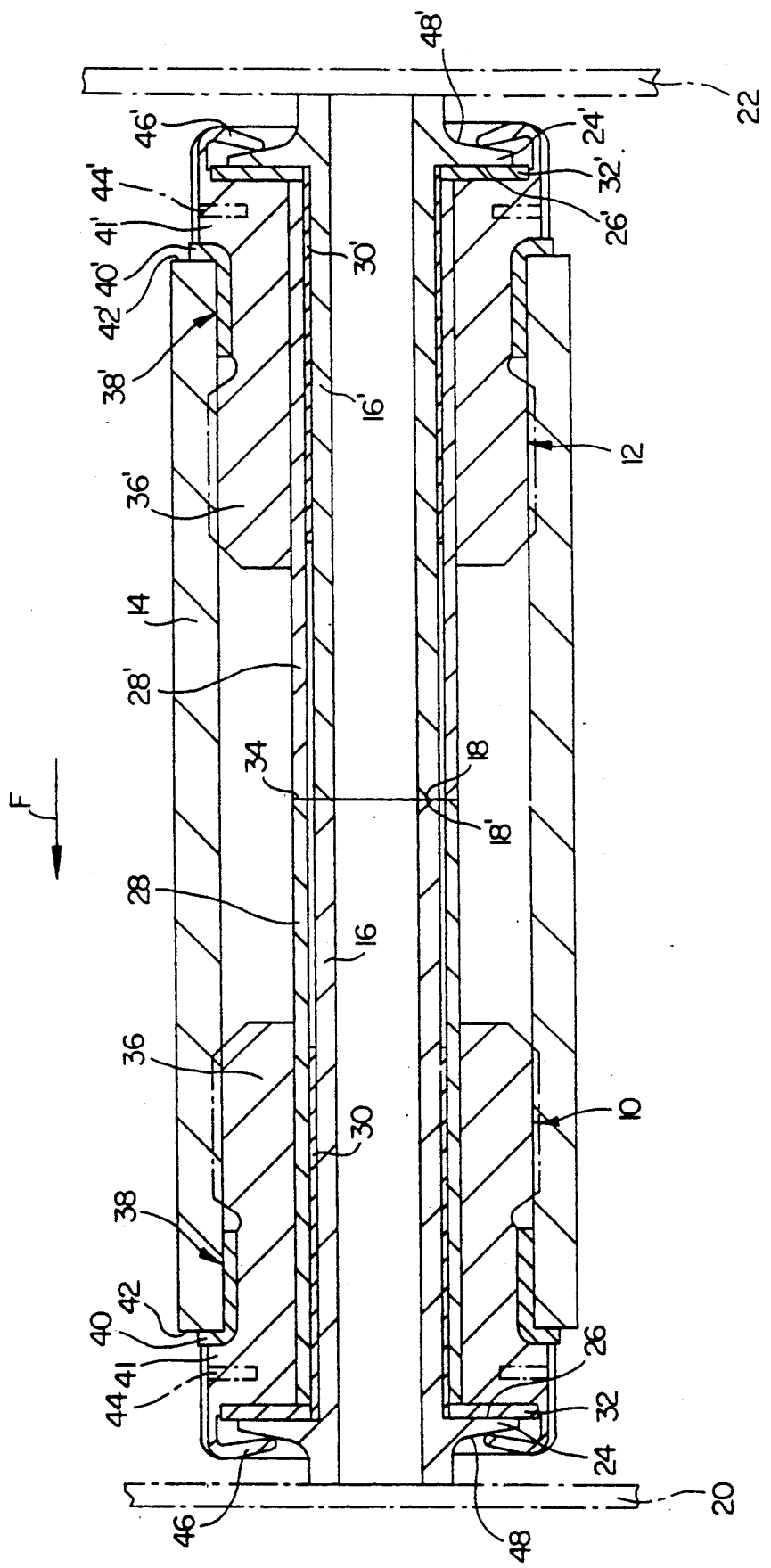

ELASTIC LINK BEARING FOR WHEEL SUSPENSIONS OF MOTOR VEHICLES

BACKGROUND AND SUMMARY OF THE INVENTION

The invention relates to an elastic link bearing for wheel suspensions of motor vehicles, especially for the body linkage of a transverse link, and, more particularly, to an elastic link bearing formed from two mutually corresponding bearing elements.

The bearing elements are placed coaxially opposite one another and each has a receiving sleeve which can be slipped onto and braced axially on a common axle fixed to the body. The receiving sleeve carries in the outer end region an end collar pointing radially outwards, an intermediate sleeve rotatable on the receiving sleeve and supported on the end collar of the latter, and an elastomeric bush which is vulcanized onto the intermediate sleeve. By means of a vulcanized-on connecting bush having a supporting flange at the outer end, the elastomeric bush can be pressed with a bonding effect into the link lug up to the abutting of the supporting flange and has an outer collar vulcanized onto the end face of the supporting flange facing away from the link lug. After the two bearing elements have been pressed into the link lug their receiving sleeves bear against one another with their inner end faces.

A link bearing of this type is known from GB-2,202,923 A, FIG. 2. In this construction, the elastomeric bushes are pressed into the link lug. Their installation position is at the same time determined by the annular disc which is vulcanized onto the outer collar engaging over the link lug and belonging to the elastomeric bushes and, during the pressing-in operation, depending on the radial overlap, comes to bear against the respective end face of the link lug only unreliably of elastic shearing stresses.

When the two bearing elements are in the installation position, although their receiving sleeves are supported on one another with their end faces located within the link lug, nevertheless a relatively large spacing remains between the end faces of the two intermediate sleeves located within the link lug. The result of this is that, when axial forces act on the link lug, such as occur, for example, during braking operations, only the bearing element located at the front in the braking direction is deformed elastically in the axial direction, i.e. subjected to shearing and compressive stresses.

The result of the axial spacing present between the intermediate sleeves of the two bearing elements is that, under the effect of axial force, the element at the rear in the direction of travel, because of the radial tension existing between its elastomeric bush and the link lug, is displaced relative to its receiving sleeve in the direction of the effective axial force and the intermediate sleeve is thereby moved away from the end collar of the receiving sleeve.

The entire axial force thus has to be supported by the front bearing element alone, and therefore this runs a high risk of wear and corrosion. The intermediate sleeves of the two bearing elements are each arranged on the sliding bush which is attached rotatably and displaceably to the receiving sleeve and which engages with an outer collar between the end collar of the receiving sleeve and the adjacent end face of the intermediate sleeve. The mutually rotatable faces of the sliding bush and receiving sleeve are lubricated.

Under the effect of axial force, the sliding bush of the rear bearing element is taken up via the intermediate sleeve attached firmly to it, its outer collar being lifted off from the end collar of the receiving sleeve. When the link bearing is relieved of axial force, the link lug together with the rear bearing element is returned abruptly into the constructional position again due to the restoring force occurring as a result of the shearing stress of the elastomeric bush of the front bearing element. The outer collar of the sliding bush at the same time strikes against the end collar of the receiving sleeve. The knocking noise thus occurring is noticed in the vehicle interior and is detrimental to motoring comfort. Moreover, lubricating grease present between the sliding faces of the two collars is displaced during the impact, thus impairing the lifetime of the rear bearing element. Finally, under the influence of axial force, the link support base within the link bearing becomes shorter, thereby resulting in inclinations of the link when the radial and cardanic link loads are superposed. Under radial link loads in particular, the elastomeric bushes are damaged in the region of the inner circumference of the annual disc vulcanized onto these by its sharp end edges limiting the central disc bore on account of their knife-like behavior.

In addition to the known bearing construction of GB 2,202,923.A, German Patent Document 2,623,870 already makes known an elastic link bearing, of which the two mutually corresponding bearing elements each have an elastomeric bush which is vulcanized onto an intermediate sleeve and which is supported by means of a vulcanized-on annular disc on the respective end face of the link lug to be mounted.

The intermediate sleeves are supported on one another and are arranged on a common receiving sleeve, by means of which they are braced axially relative to one another and which is itself held on a bearing axle.

Apart from the fact that the intermediate sleeves are braced between bracket legs and consequently this link bearing constitutes a torsion bearing, under the effect of axial force on the link lug the latter is lifted off from the annular disc of the bearing element located at the rear, as seen in the direction of force, and strikes audibly against this as soon as the link lug is relieved again in the axial direction.

Machine-Design/Aug. 10, 1989, page 44, discloses a link bearing, in which the connection between the elastomeric bushes, which are each vulcanized onto an intermediate sleeve, of its two bearing elements and the link lug is already made by means of a respective connecting bush vulcanized onto this and being pressable with a bonding effect into one end face of the link lug and equipped with an outer flange vulcanized onto an outer collar of the respective elastomeric bush.

In this bearing construction, however, the intermediate sleeves are mounted on the receiving sleeve so as to be mutually displaceable in the axial direction, so that, under the effect of axial force, the intermediate sleeve together with the elastomeric bush of one bearing element can shift axially.

There is therefore needed an improved elastic link bearing in a design of the type mentioned above with respect to GB 2,202,923A operating in such a way that adverse influences on motoring comfort, service life and functioning are avoided.

This need is met according to the present invention, by an elastic link bearing formed from two mutually corresponding bearing elements. The bearing elements are placed coaxially opposite one another and each has a receiving sleeve which can be slipped onto and braced axially on a common axle fixed to the body. The receiving sleeve carries in the outer end region an end collar pointing radially outwards, an intermediate sleeve rotatable on the receiving sleeve and supported on the end collar of the latter, and an elastomeric bush which is vulcanized onto the intermediate sleeve. By means of a vulcanized-on connecting bush having a supporting flange at the outer end, the elastomeric bush can be pressed with a bonding effect into the link lug up to the abutting of the supporting flange and has an outer collar vulcanized onto the end face of the supporting flange facing away from the link lug. After the two bearing elements have been pressed into the link lug their receiving sleeves bear against one another with their inner end faces. When an axial load occurs, the intermediate sleeves bear against one another with force transmission.

Thus, in the link bearing according to the present invention, under the influence of axial force it is possible, where appropriate, for there to be only a minimal axial displacement of the intermediate sleeve of one bearing element in relation to the receiving sleeves. This prevents the possibility that, under the effect of axial force, one of the intermediate sleeves will move away from the end collar of the receiving sleeve carrying it, to such an extent that knocking noises occur, and that lubricating grease between the mutually engaged sliding faces of the end collar and intermediate sleeve will be displaced when the bearing is relieved of axial force.

Equipping the elastomeric bush of the bearing elements with a connecting bush vulcanized onto this and pressable with a bonding effect into one of the end faces of the link lug ensures an interconnection of elastomeric bushes and link lug which guarantees that, under the influence of axial force, the two elastomeric bushes are subjected to a uniform stress. This affords the advantage that a substantial relief of the elastomeric bush and of the mutually engaged sliding faces of the bearing element located to the front in the direction of force is achieved.

Finally, the axial dimensioning of the two intermediate sleeves on the receiving sleeves and the slip-free connection of the elastomeric bushes and link lug make it possible to reduce the constructional length of the elastomeric bushes, without functional disadvantages arising from this, especially a shortening of the link support base.

Other objects, advantages and novel features of the present invention will become apparent from the following detailed description of the invention when considered in conjunction with the accompanying drawings.

BRIEF DESCRIPTION OF THE DRAWINGS

An exemplary embodiment of a link bearing according to the invention is shown in a longitudinal sectional view in the drawing.

DETAILED DESCRIPTION OF THE DRAWINGS

The link bearing is composed of two identical bearing elements 10 and 12 which are placed coaxially opposite one another and each of which can be inserted into one of the end faces of a link lug 14. The link bearing serves, for example, for the body linkage of a transverse link of an independent wheel suspension.

In view of the identical design of the two bearing elements 10 and 12, only the constructive design of one of these is explained below, the same reference numerals, but bearing a prime, being used for the components of the other bearing elements.

The bearing elements 10 and 12 have respective receiving sleeves 16, 16' which can be pushed onto a bearing axle (not shown) and which bear against one another with their inner end faces 18, 18' and can be clamped between two bearing brackets 20 and 22 receiving the bearing axle and represented by dot-and-dash lines.

The receiving sleeves 16, 16' are each equipped, on their outer sleeve endpiece, with an outer end collar 24, 24' which has a radial supporting face 26, 26' confronting the link lug 14.

An intermediate sleeve is designated by 28, 28' and is mounted on the receiving sleeve 16, 16' rotatably and axially displaceably by means of a bearing bush 30, 30' consisting of a suitable sliding material (for example, Teflon TM, bronze, etc.).

The intermediate sleeve 28, 28' is in sliding engagement with the supporting face 26, 26' by means of an outer flange 32, 32'. Alternatively, between the two parts 24, 24' and 32, 32' there could also be an intermediate disc which consists of a sliding material and which could also be in one piece with the bearing bush 30, 30'.

The intermediate sleeves 28 and 28' are preferably longer than the bearing bushes 30 and 30' reaching near to the end collar 24, 24' of the receiving sleeve 16, 16' and, as shown, are supported on one another at 34 under axial load on their inner sleeve end face. In the no-load state, the sleeve end faces 18, 18' can be free from one another with a constructionally fixed minimum clearance or bear against one another with no force transmission.

On the intermediate sleeve 28, 28' there is an elastomeric bush 36, 36', preferably consisting of rubber, which is vulcanized both on the outer circumference of the sleeve and on its outer flange 32, 32' and the length of which corresponds approximately to that of the bearing bush 30, 30'.

A cylindrical connecting bush is designated as a whole by 38, 38' and is vulcanized onto the outer circumference of the elastomeric bush 36, 36' in the region of the outer flange 32, 32' of the intermediate sleeve 28, 28'. Formed on this connecting bush 38, 38', on its end face confronting the outer flange 32, 32' of the intermediate sleeve 28, 28', is a supporting flange 40, 40' which is vulcanized onto an outer collar 41, 41' of the bush 36, 36' and which, during the mounting of the bearing element 10, 12 or during the pushing of its elastomeric bush 36, 36' into one of the end faces of the link lug 14, comes to bear against its end face 42, 42' and thus fixes the installation position.

For this purpose, the outer flange 32, 32' has a larger outside diameter than the connecting bush 38, 38', with the result that the elastic outer collar 41, 41' of the bushes 36, 36' is stabilized correspondingly in their axial direction. For the same purpose, at least one metal annular disc 44, 44' could also additionally be vulcanized into the outer collar 41, 41' (as represented by dot-and-dash lines).

The outside diameter of the connecting bush 38, 38' is coordinated with the inside diameter of the link lug 14 to such a quality of fit that it is held in this with a press fit. After the link bearing has been mounted on the bearing axle and in the link lug 14, the receiving sleeves 16 and 16' are supported on one another with their inner end faces.

Consequently, insofar as forces acting, for example, in the direction of travel F are applied to the link, the link lug 14 is shifted axially relative to the bearing axle in this direction.

The respective mutual support of the intermediate sleeves 28 and 28' and of the elastomeric bushes 36 and 36' then ensures that the two elastomeric bushes 36, 36' of the bearing elements 10 and 12 are subjected to a joint load. The end face of the link lug 14 bearing against the supporting flange 40' therefore cannot lift off from this. Axial shifts of the link lug 14 thus take place completely silently, the sliding faces of the bearing element located at the front in the direction of force being relieved correspondingly.

Formed onto the bush outer collar 41, 41' and the outer edge part of the outer flange 32, 32' is a sealing lip 46, 46' which engages over the end collar 24, 24' of the receiving sleeve 16, 16' and which is supported sealingly against its outer end face 48, 48'.

The sliding faces of the end collar 24, 24' and outer flange 32, 32' are thereby shielded from the atmosphere, that is to say from dirt and water, and an escape of lubricating grease is prevented.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An elastic link bearing for a wheel suspension of a motor vehicle having a common axle comprising:
   a link lug;
   two mutually corresponding bearing elements placed coaxially opposite one another, each bearing element including:
   a receiving sleeve which is slipped onto and braced axially on the common axle fixed to the motor vehicle's body, said receiving sleeve having in an outer end region an end collar directed radially outwards;
   an intermediate sleeve rotatable on the receiving sleeve and supported on the end collar of the receiving sleeve;
   an elastomeric bush vulcanized onto the intermediate sleeve;
   a connecting bush vulcanized on the elastomeric bush and having a supporting flange at an outer end,
   wherein the elastomeric bush can be pressed with a bonding effect into the link lug up to an abutment of the supporting flange against the link lug, the elastomeric bush having an outer collar vulcanized to an end face of the supporting flange facing away from the link lug;
   wherein an inner end face of the receiving sleeve of each of the two bearing elements bears against one another after the two bearing elements are pressed into the link lug; and
   wherein when an axial load occurs, the intermediate sleeve of each of the bearing elements bears against one another with force transmission.

2. An elastic link bearing according to claim 1, further comprising:
   a sliding disc supporting an outer end face of each intermediate sleeve and bearing rotatably on the outer end collar of the associated receiving sleeve and vulcanized onto the outer end face of the elastomeric bush.

3. An elastic link bearing according to claim 1, further comprising a sealing lip which engages over the end collar of the receiving sleeve and bears against the end collar's outer end face, the sealing lip being formed on the outer end face of the elastomeric bush of each bearing element.

* * * * *